United States Patent
Lowchareonkul (10) Patent No.: US 10,944,268 B1
(45) Date of Patent: Mar. 9, 2021

(54) GRID-ISOLATED SOLAR SYSTEM

(71) Applicant: Phahol Lowchareonkul, Los Altos Hills, CA (US)

(72) Inventor: Phahol Lowchareonkul, Los Altos Hills, CA (US)

(*) Notice: Subject to any disclaimer, the term of this patent is extended or adjusted under 35 U.S.C. 154(b) by 133 days.

(21) Appl. No.: 16/281,515

(22) Filed: Feb. 21, 2019

(51) Int. Cl.
| | |
|---|---|
| *H02J 3/38* | (2006.01) |
| *H02S 40/32* | (2014.01) |
| *H02S 40/38* | (2014.01) |
| *H02S 40/34* | (2014.01) |
| *H01F 38/30* | (2006.01) |
| *H02J 7/35* | (2006.01) |

(52) U.S. Cl.
CPC .............. *H02J 3/385* (2013.01); *H01F 38/30* (2013.01); *H02J 7/35* (2013.01); *H02S 40/32* (2014.12); *H02S 40/34* (2014.12); *H02S 40/38* (2014.12)

(58) Field of Classification Search
CPC .. H02J 3/385; H02J 7/35; H01F 38/30; H02S 40/34; H02S 40/32; H02S 40/38
See application file for complete search history.

(56) References Cited

U.S. PATENT DOCUMENTS

| | | | |
|---|---|---|---|
| 8,338,987 B2* | 12/2012 | O'Brien | H02J 3/24 |
| | | | 307/82 |
| 9,136,732 B2* | 9/2015 | Wolter | H02S 40/36 |
| 2014/0103855 A1* | 4/2014 | Wolter | H02S 50/00 |
| | | | 320/101 |
| 2018/0351504 A1* | 12/2018 | Chapman | H02S 40/34 |

* cited by examiner

*Primary Examiner* — Daniel Cavallari
(74) *Attorney, Agent, or Firm* — Kevin Roe (57) ABSTRACT

Grid-isolated solar system and method to use a solar electrical power regulator to control each battery commander and control each micro-inverter that produce AC electrical power from one or more solar cell panels. One embodiment is a system to regulate the total AC electrical power to avoid sending electrical power to an outside electrical utility grid. A second embodiment is an apparatus to regulate the total AC electrical power produced by one or more solar cell panels to avoid sending electrical power to an outside electrical utility grid.

19 Claims, 12 Drawing Sheets

GRID-ISOLATED SOLAR SYSTEM

BACKGROUND OF THE INVENTION

Field of the Invention

This invention relates generally to the field of installing solar systems, and more specifically to providing a grid-isolated solar system.

Description of the Prior Art

Solar panel (e.g., photo-voltaic panel or PV panel, and so forth) systems have been known and used for many years, but have been difficult for many consumers to afford and to obtain. Homes and commercial buildings with solar panels convert sunlight radiant energy into direct current electrical power, and an inverter converts the direct current (DC) power to alternating current (AC) power, that is grid-compatible power. Then the electrical utility company that serves the consumer's neighborhood gives the consumer credit for the energy that the consumer contributes to the electrical utility company's power grid.

One major problem is that regulatory authorization for a traditional solar (i.e., utility company approved solar power) is expensive and difficult to obtain. Since a photovoltaic (PV) system is considered a "generator" where it is putting energy back to the electrical utility company's power grid, many expensive and time consuming regulatory steps must be laboriously implemented and achieved for a home or commercial consumer to install a solar PV system.

SUMMARY OF THE INVENTION

The present invention provides a method to control solar power production so that it is equal to or less than a home's current consumption or a commercial building's current consumption. As a result, the energy produced is never put back to the electrical utility company's power grid. The solar produced electrical power is locally contained behind the meter (i.e., on the consumer's side of the meter) where the electrical utility company does not own and does not control. As a result, it is not necessary to seek interconnection and regulatory permission from a electrical utility company for solar power systems implemented with various embodiments of the invention. Embodiments of the invention can be implemented in numerous ways. Three aspects of the invention are described below.

A first aspect of the invention is directed to a grid-isolated solar system. The system includes a solar electrical power regulator; one or more battery modules; one or more battery commanders to route DC electrical power to or from the one or more battery modules, wherein each battery commander is controlled by the solar electrical power regulator; and one or more micro-inverters that can take DC electrical power as an input and produce AC electrical power, wherein each micro-inverter is controlled by the solar electrical power regulator.

A second aspect of the invention is directed to a grid-isolated solar system apparatus. The grid-isolated solar system apparatus includes one or more split core transformers that can provide two or more current measurements from one or more electrical utility lines coupled to a building junction box; one or more micro-inverters having inputs that can be connected to one or more solar power panels, and outputs that can provide AC electrical power; one or more battery modules that can be coupled to the one or more solar power panels; one or more battery commanders, wherein the one or more battery commanders can couple the one or more solar panels to the one or more battery modules; and a solar electrical power regulator that can couple to the one or more battery commanders, the one or more micro-inverters and the one or more split core transformers, wherein electrical power from the one or more micro-inverters is blocked from reaching through an electrical utility meter to an electrical utility grid.

A third aspect of the invention is directed to a grid-isolated solar system apparatus. The grid-isolated solar system apparatus includes one or more split core transformers that can provide one or more current measurements from one or more electrical utility lines coupled to a building junction box; one or more micro-inverters having inputs that can be coupled to one or more solar power panels, and outputs that can provide AC electrical power to a building; one or more battery modules that can be coupled to the one or more solar power panels; one or more battery commanders, wherein the one or more battery commanders can couple the one or more solar panels to the one or more battery modules; and a solar electrical power regulator that can couple to the one or more battery commanders, the one or more micro-inverters and the one or more split core transformers, wherein AC electrical power produced from the one or more micro-inverters is blocked from reaching through an electrical utility meter to an electrical utility grid, wherein a wireless module is included with the solar electrical power regulator to allow a wireless smart device to communicate with the solar electrical power regulator.

BRIEF DESCRIPTION OF THE DRAWINGS

Non-limiting and non-exhaustive embodiments of the invention are described with reference to the following figures or drawings.

DETAILED DESCRIPTION OF THE PREFERRED EMBODIMENTS

Embodiments of the invention can be constructed from off-the-shelf components. In various embodiments disclosed below, different components or the same components could be used for the grid-isolated solar system. For example, embodiments of the invention can be constructed using various identical or different commercially available microprocessors or micro-controllers (e.g., 8 bit, 16 bit, 32 bit, 64 bit microprocessors or micro-controllers, and so forth). The microprocessor(s) or micro-controller(s) that are selected should have sufficient capability to determine the various states of operation of the solar electrical power regulator and the grid-isolated solar system. And various embodiments of the invention can be constructed from various types of memory for the use of the microprocessor or micro-controller, such as commercially available random access memory (RAM) and flash memory components incorporated internally or externally. In various embodiments, other types of volatile memory and non-volatile memory components can be used.

Embodiments of the invention can be constructed using wired or wireless modules. In one embodiment, a wireless module would be coupled to a battery commander. Wireless communication can be simplex, semi-duplex, or full duplex. In various embodiments, the solar electrical power regulator can connect to smart devices through Bluetooth, Bluetooth low energy, WiFi, or other equivalent protocol to supply a consumer with information regarding the system health, energy production, consumption, and configurations.

Embodiments of the invention can be constructed various implementations of a battery commander. The battery commander controls battery charging by one or more solar panels, as determined by the solar electrical power regulator. In one embodiment, there are three modes of operation for a battery commander. In one mode, solar power is provided to power the micro-inverter(s). In a second mode, solar power is provided to the battery module(s) to charge the battery module(s). In a third mode, the battery module(s) provide electrical power to the micro-inverter(s). In one embodiment, the method of directing the electrical connection can be implemented with one or more mechanical relays, bipolar junction transistors (BJT) or field effect transistors (FET).

Embodiments of the invention can be constructed using various battery module(s) to stores DC electrical power when excess DC electrical power is generated. DC electrical power can then be routed to micro-inverter(s) to produce AC electrical power, even though the solar panels produce no or insufficient electrical power. A battery module can include Lead-Acid, Lithium, Nickel Metal Hydride, Nickel Cadmium, or equivalent battery technologies.

Embodiments of the invention can be constructed using various types of micro-inverters and off-grid inverters. A micro-inverter or off-grid inverter converts DC electrical power to AC electrical power. In various embodiments, a micro-inverter or off-grid inverter can work with any 100 VAC to 240 VAC systems, and can work with any 50 Hz to 60 Hz systems. The VAC systems may be one phase, two phase or three phase systems, depending on the nature of the building (e.g., residential, commercial, industrial and so forth) and depending on the country. A micro-inverter or off-grid inverter can also have partially-on state to insure that AC electrical power production is less than or equal to energy consumption. In one embodiment, up to 32 micro-inverters can be controlled by the solar electrical power regulator. In another embodiment, more than 32 micro-inverters can be controlled by the solar electrical power regulator.

Various embodiments of the invention include a straight connector to carry electrical power from a T-harness connector that is connected to the micro-inverter(s). If the B plug is cut off the straight connector, the straight connector can connect the T-harness connector to the three main wires of the junction box to provide electrical power to the building. If the B plug is not cut off the straight connector, the straight connector can plug directly into an electrical outlet, but it will only be able to provide up to 15 amperes of current to a building.

Components

In various embodiments, the grid-isolated solar system includes one or more of the following types of components. Table 1 provides a list of components for one embodiment of the invention as shown in the following figures, but alternative embodiments can have a subset of the following components or additional components.

TABLE 1

| Element | Name and Description |
|---|---|
| 100 | Solar Electrical Power Regulator<br>Primary support component for system to be implemented on a roof of a structure or near a structure. |
| 101 | Electrical Utility Meter<br>Typically coupled with junction box. |
| 102 | Electrical Utility Wires for AC<br>Typically two hot phase wires to provide up to 240 volts AC and a neutral wire. |
| 104, 146, 160 | Microprocessor or Micro-controller<br>Determines the various states of operation of the solar electrical power regulator and the grid-isolated solar system. In various embodiments, they may be the same or different<br>Memory<br>Provide memory for microprocessor.<br>RAM memory<br>Provides random access memory for reading and writing data or instructions.<br>Non-volatile memory<br>Provides non-volatile memory (e.g., Flash memory, etc.) that survives power off states. |
| 108, 150, 162 | Wireless Module<br>Couples to solar electrical power regulator. Wireless communication can be simplex, semi-duplex, or full duplex. Solar regulator connects to smart devices through Bluetooth, Bluetooth low energy, WiFi, or other equivalent protocol to supply user with information regarding the system health, energy production, consumption, and configurations. In one embodiment, there is a primary wireless module in the solar electrical power regulator and secondary wireless modules in each of the battery commanders and each of the micro-inverters. |
| 109 | AC Current Detection Circuit<br>Determines if AC current is going in or out. This circuit works with 1, 2, or 3 phase systems. |
| 110 | Battery Commander<br>Controls battery charging by solar panel, as determined by solar electrical power regulator. In one embodiment, there are three modes of operation for a battery commander. Solar power provided to power the micro-inverter(s). Solar power provided to charge the battery module(s). Battery module(s) routed to power the micro-inverter(s). In one embodiment, the method of directing the connection can be implemented with one or more mechanical relays, bipolar junction transistors (BJT) or field effect transistors (FET). |
| 112 | Off-Grid Controller<br>In one embodiment, the off-grid controller is simply a battery capacity multiplexer. It multiplexes the battery modules so that when one battery module runs out of power, it switches that battery module off and another |

TABLE 1-continued

| Element | Name and Description |
|---|---|
| | battery module is turned-on to create a seamless user experience so that the customer does not have switch battery modules. This action is microprocessor or micro-controller controlled using an algorithm explained below. |
| 113 | Micro-Inverter
Converts DC power to AC power. Can work with 110 VAC or 240 VAC systems. Can work with 60 Hz or 50 Hz systems. Inverters can also have partially on state to insure that AC electrical power production is less than or equal to energy consumption. In one embodiment, up to 32 micro-inverters can be controlled by the solar electrical power regulator. |
| 114 | Battery Module
Stores DC electrical power when excess DC electrical power is generated. DC electrical power can then be routed to micro-inverter(s) to produce AC electrical power, even though solar panels produce no or insufficient electrical power. Battery can be Lead-Acid, Lithium, Nickel Metal Hydride, Nickel Cadmium, or equivalent battery technologies. |
| 115 | Solar Cell Panel
Solar cell technologies can be mono-crystalline, poly-crystalline, flex or any other equivalent solar cell. |
| 116 | Split Core Transformer
Measures currents in the two hot phase electrical lines. In one embodiment, there is one or more split core transformers coupled to the solar electrical power regulator to measure AC currents in the utility electrical wires coming into the junction box. |
| 118 | Off-Grid Inverter
Couples to off-grid controller of the solar electrical power regulator. The off-grid inverter has one or more electrical outlets to provide AC electrical power to any corded device or appliance. |
| 119 | Smart Device
Allows a consumer to check the status of the system, power consumption, and power generation. |
| 120 | Utility Electrical Meter
Can be a Net Meter, Bi-Directional Meter or a Single Direction Meter. |
| 122 | AC Power Insertion Link
The AC power insertion link is a junction box if it is connected to the T-harness connector (if the B plug was cut off) to provide more electrical energy to the building than can be provided by a B-plug connector plugged into an AC electrical outlet (15 ampere limit) acting as an AC power insertion link. |
| 124 | T-Harness Connector
Connects the micro-inverters to the solar power electrical regulator. |
| 126 | Straight Connector
If the B plug is cut off, the straight connector connects the T-harness connector to a junction box acting as an AC power insertion link to provide electrical power to the building. If the B plug is not cut off, then the straight connector B plug can plug into an electrical outlet and provide up to 15 amperes of current to the house. |
| 132, 148, 170 | LED Indicator Lights
In various embodiments they can be LEDs or any other type of indicator lights or a display to provide information to a user. |
| 140 | DC/DC Boost and MPPT
MPPT stands for maximum power point tracking. |
| 142 | DC/AC Inverter |
| 144 | Output Filter
Standard band-pass filter made with capacitors, resistors and inductors. |
| 152, 158, 172 | DC Switch |
| 154, 166, 174 | Current Detection Circuit |
| 156, 168 | Voltage Detection Circuit |
| 164 | PWM Charge Circuit
Pulse width modulation charge circuit. |

Various Embodiments are Possible

Various embodiments of the invention can be implemented with one or more battery commanders. One embodiment utilizes only one battery commander. One embodiment utilizes two or more battery commanders. One embodiment allows an off-grid controllers to be coupled to each battery module. An off-grid controller can multiplex a plurality of battery modules. An off-grid controller can be used to provide off-grid AC power through an off-grid inverter, and allow a customer to install additional solar panels at a later time as need requires.

Figure 1A:
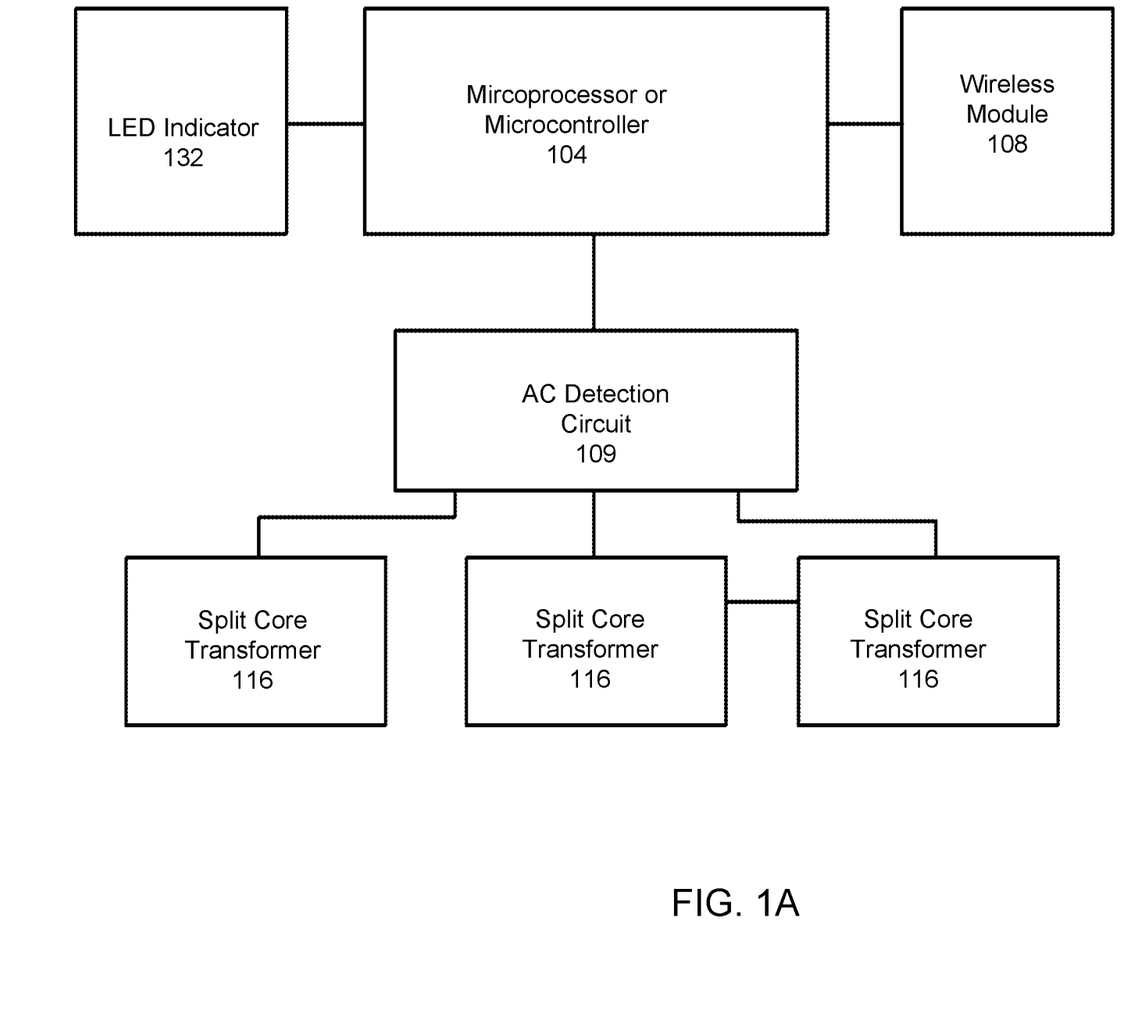
FIG. 1A illustrates a solar electrical power regulator, in accordance with one embodiment of the invention.

FIG. 1A illustrates a solar electrical power regulator, in accordance with one embodiment of the invention. The solar electrical power regulator 100 includes a microprocessor or micro-controller 104, a wireless module 108, and an AC current detection circuit 109 and LED indicator 132. Also shown are split core transformers 116, coupled to the AC current detection circuit 109, which are not part of the solar electrical power regulator. Various embodiments of the invention can be coupled to one or more split core transformers.

Figure 1B:
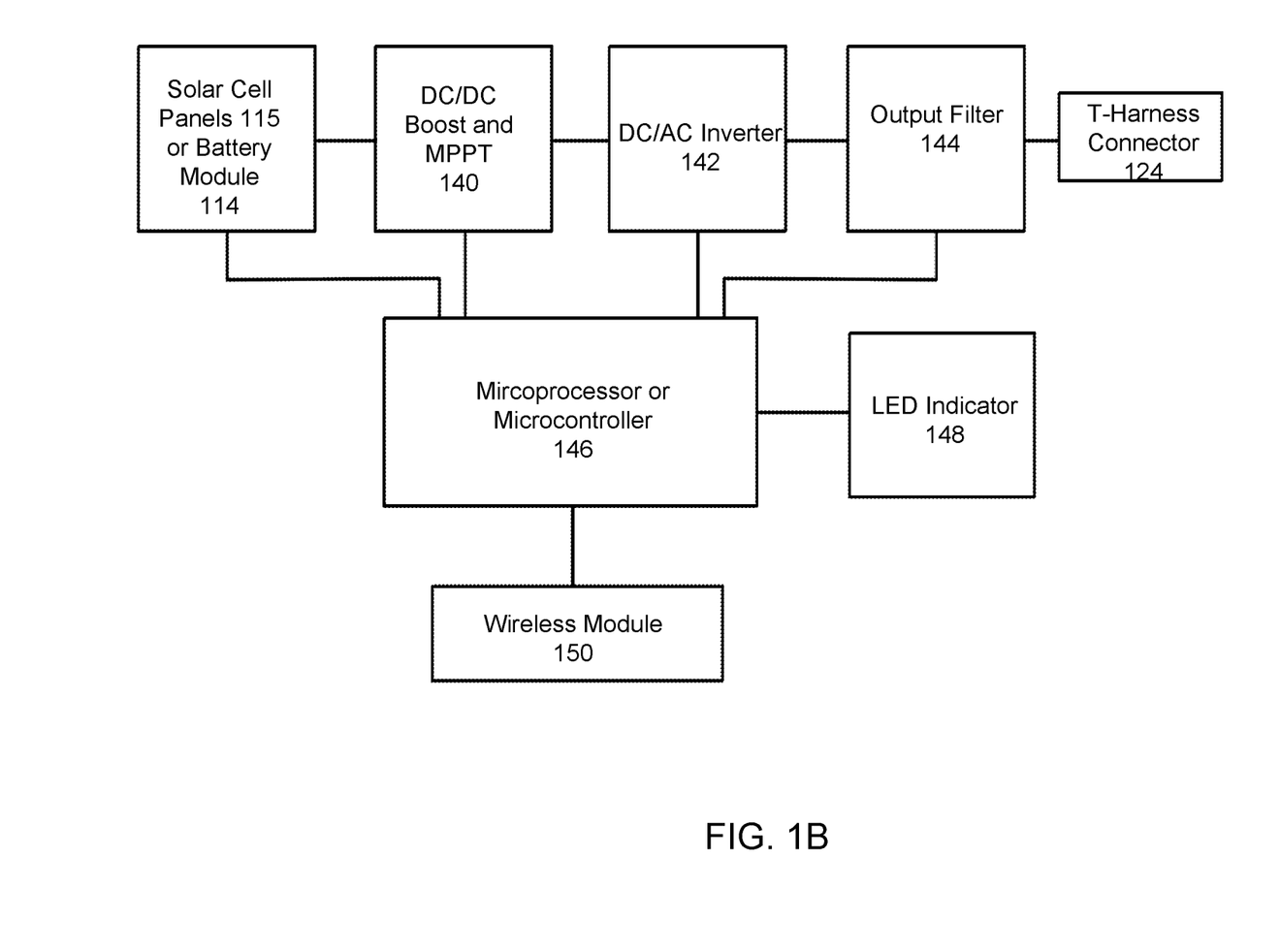
FIG. 1B illustrates a micro-inverter block diagram, in accordance with one embodiment of the invention.

FIG. 1B illustrates a micro-inverter block diagram, in accordance with one embodiment of the invention. This embodiment includes a DC/DC boost and MPPT module 140, a DC/AC inverter 142, an output filter 144, a microprocessor or micro-controller 146, an LED indicator 148, and a wireless module 150. The micro-inverter is coupled to a solar cell panel 115 or battery module 114 to provide DC power as an input and coupled to a T-Harness connector 124 to provide AC power to the building's electrical grid.

Figure 1C:
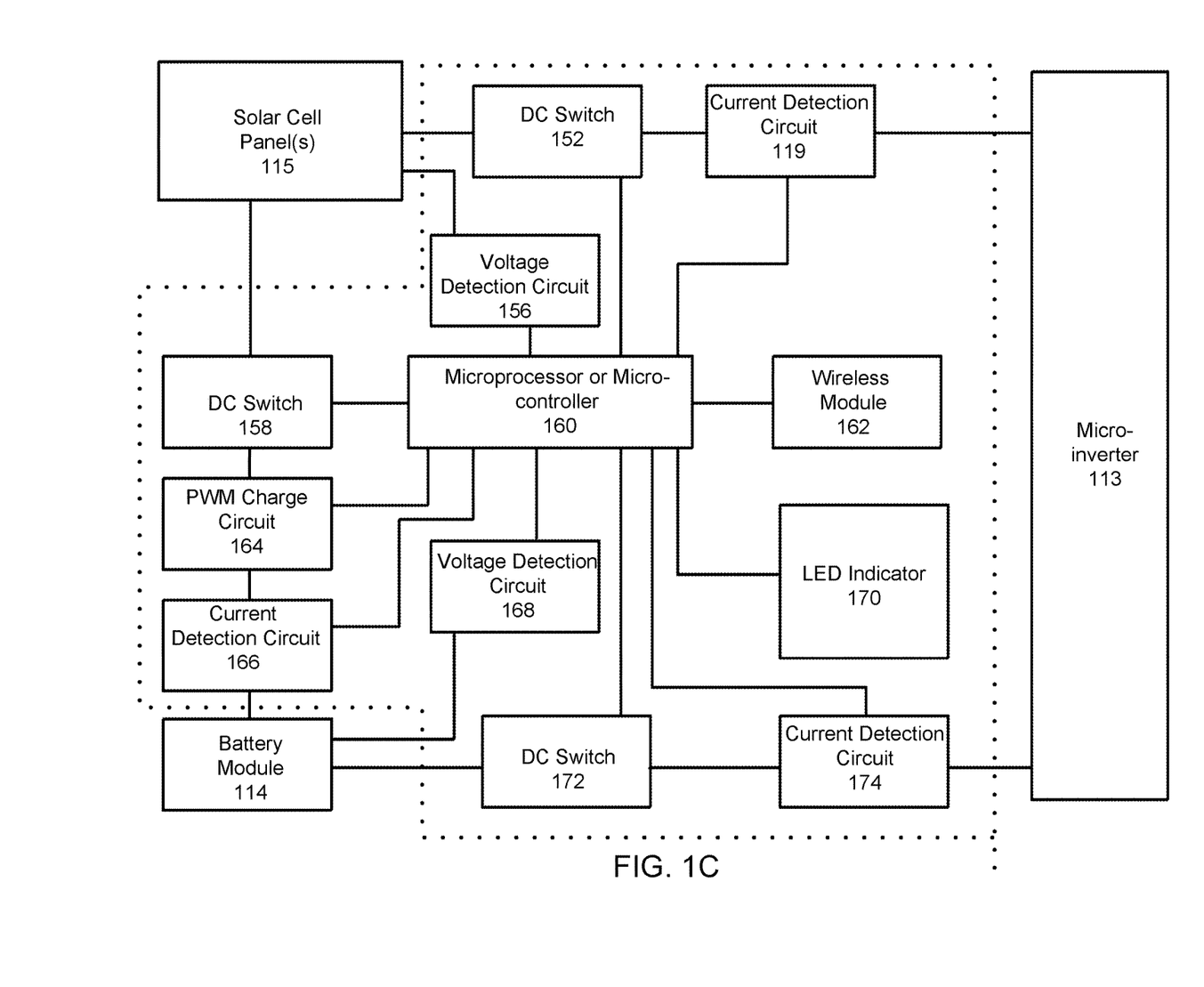
FIG. 1C illustrates a block diagram of a battery commander for a grid-isolated solar system, in accordance with one embodiment of the invention.

FIG. 1C illustrates a block diagram of a battery commander for a grid-isolated solar system, in accordance with one embodiment of the invention. One or more solar cell panels 115 provide DC power as an input to the battery commander. In one embodiment of the invention, the battery commander (shown within dotted lines) includes a DC switch 152, a current detection circuit 154. a voltage detection circuit 156, a DC switch 158, a microprocessor or micro-controller 160, a wireless module 162, a PWM charge circuit 164, a current detection circuit 166, a voltage detection circuit 168, LED indicators 170, a DC switch 172 and a current detection circuit 174. A micro-inverter 113 receives DC power from current detection circuits 154 and 166. A battery module 114 is coupled to the current detection circuit 166, the voltage detection circuit 168 and the DC switch 172. One or more solar cell panels 115 is electrically coupled through the battery commander to either to a micro-inverter 113 or to the battery module 114, under the control of the microprocessor or micro-controller 160.

Figure 1D:
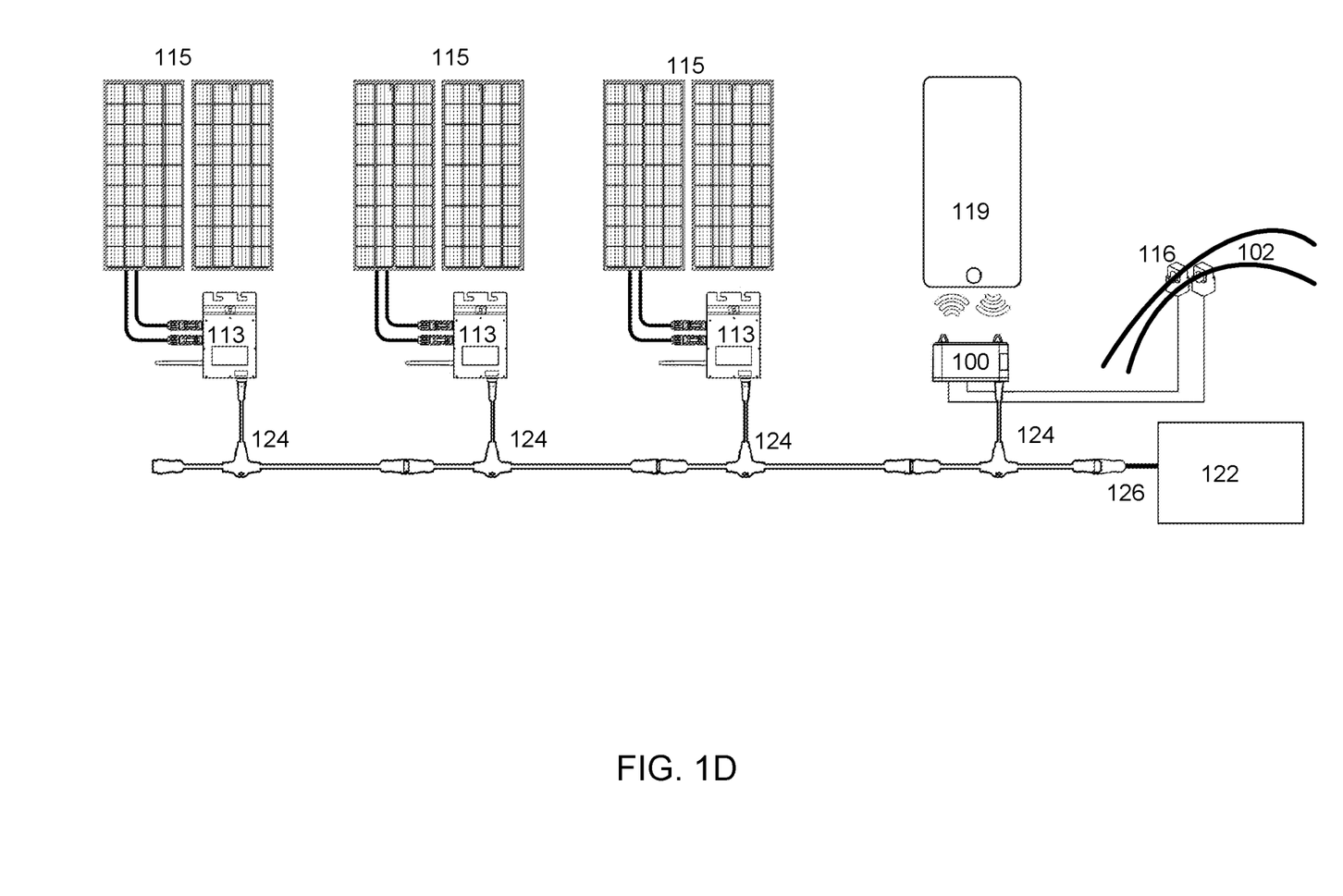
FIG. 1D illustrates a view of an entire grid-isolated solar system, in accordance with one embodiment of the invention.

FIG. 1D illustrates a view of an entire grid-isolated solar system, in accordance with one embodiment of the invention. The AC power insertion link 122 (e.g., a junction box, a single phase AC or a dual phase AC or a triple phase AC electrical outlet, or an equivalent) in various embodiments could couple solar generated AC electrical power into a single family house, apartment building, office building, or any type of structure that has a roof or some nearby space (not shown) that can support one or more solar cell panels 115. Each solar cell panel 115 is electrically coupled to a micro-inverter 113 that is coupled into a T-harness cable 124 that is coupled to a chain of T-harness cables 124 that are coupled to a solar electrical power regulator 100, which in turn is wirelessly coupled to a smart device 119 and coupled by wires to split core transformers 116 that monitor the two hot phase wires of the building's external electrical utility AC power cables 102. The solar electrical power regulator 100 is also coupled by a T-harness cable 124 to a straight connector 126 to couple to the AC power insertion link 122 (which is used by the invention, but which is not part of the invention).

Figure 1E:
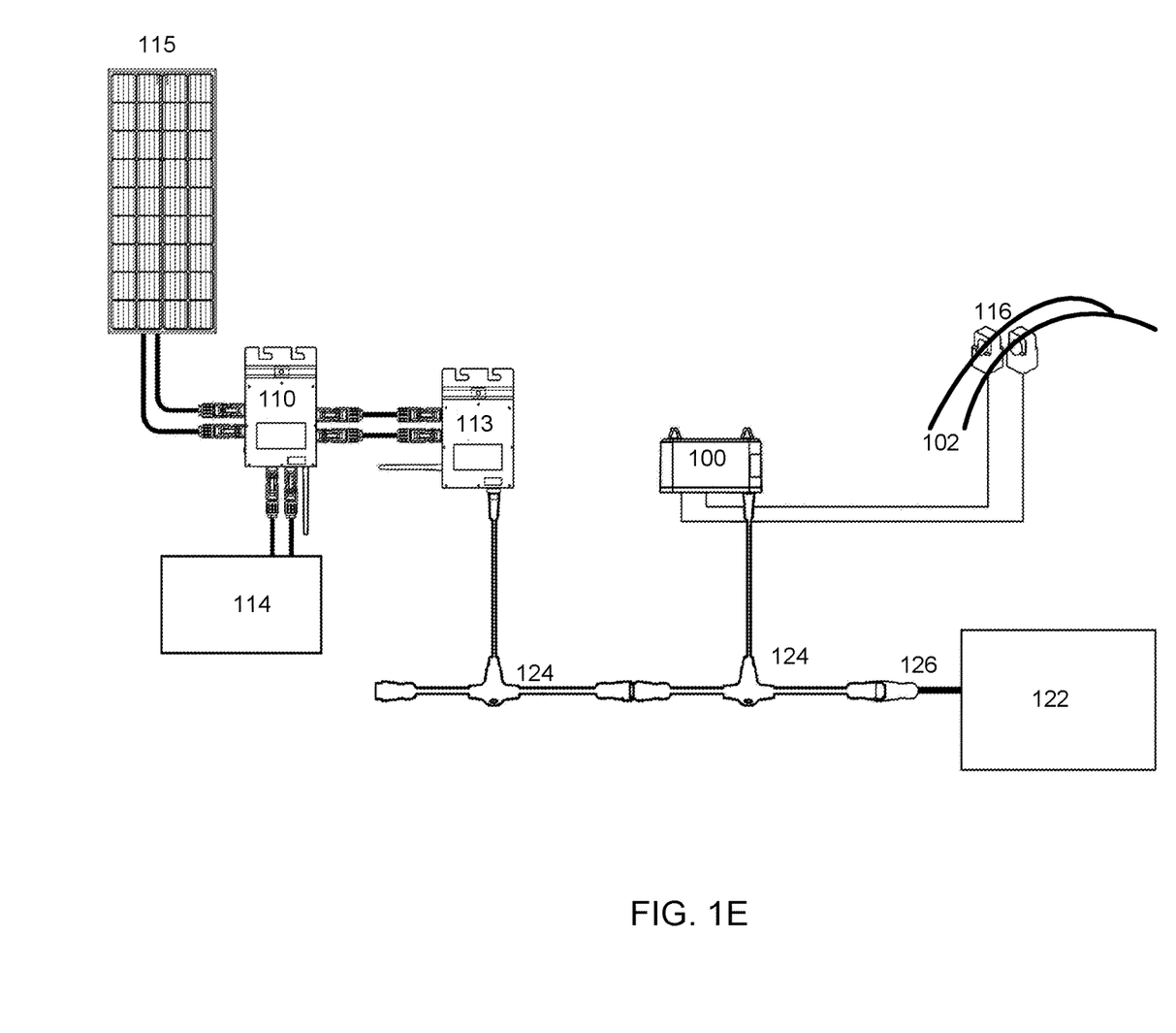
FIG. 1E illustrates a view of an entire grid-isolated solar system, in accordance with one embodiment of the invention.

FIG. 1E illustrates a grid-isolated solar system, in accordance with one embodiment of the invention. The AC power insertion link 122 (e.g., a junction box, a single phase AC, a dual phase AC or a triple phase AC electrical outlet, or an equivalent) in various embodiments could couple solar generated AC electrical power into a single family house, apartment building, office building, or any type of structure that has a roof or some nearby space (not shown) that can support one or more solar cell panels 115. Each solar cell panel 115 is electrically coupled to a battery commander 110 that is in turn coupled to a battery module 114. The battery commander 110 is also coupled to a micro-inverter 113 that is coupled into a T-harness cable 124 that is coupled to a chain of T-harness cables 124 that are coupled to a solar electrical power regulator 100 coupled by wires to split core transformers 116 that monitor the two hot phase wires of the building's external electrical utility AC power cables 102. The solar electrical power regulator 100 is also coupled by a T-harness cable 124 to a straight connector 126 to couple to the AC power insertion link 122 (typically a junction box, which is used to receive AC electrical power produced by the invention, but the AC power insertion link is not part of the invention).

Figure 1F:
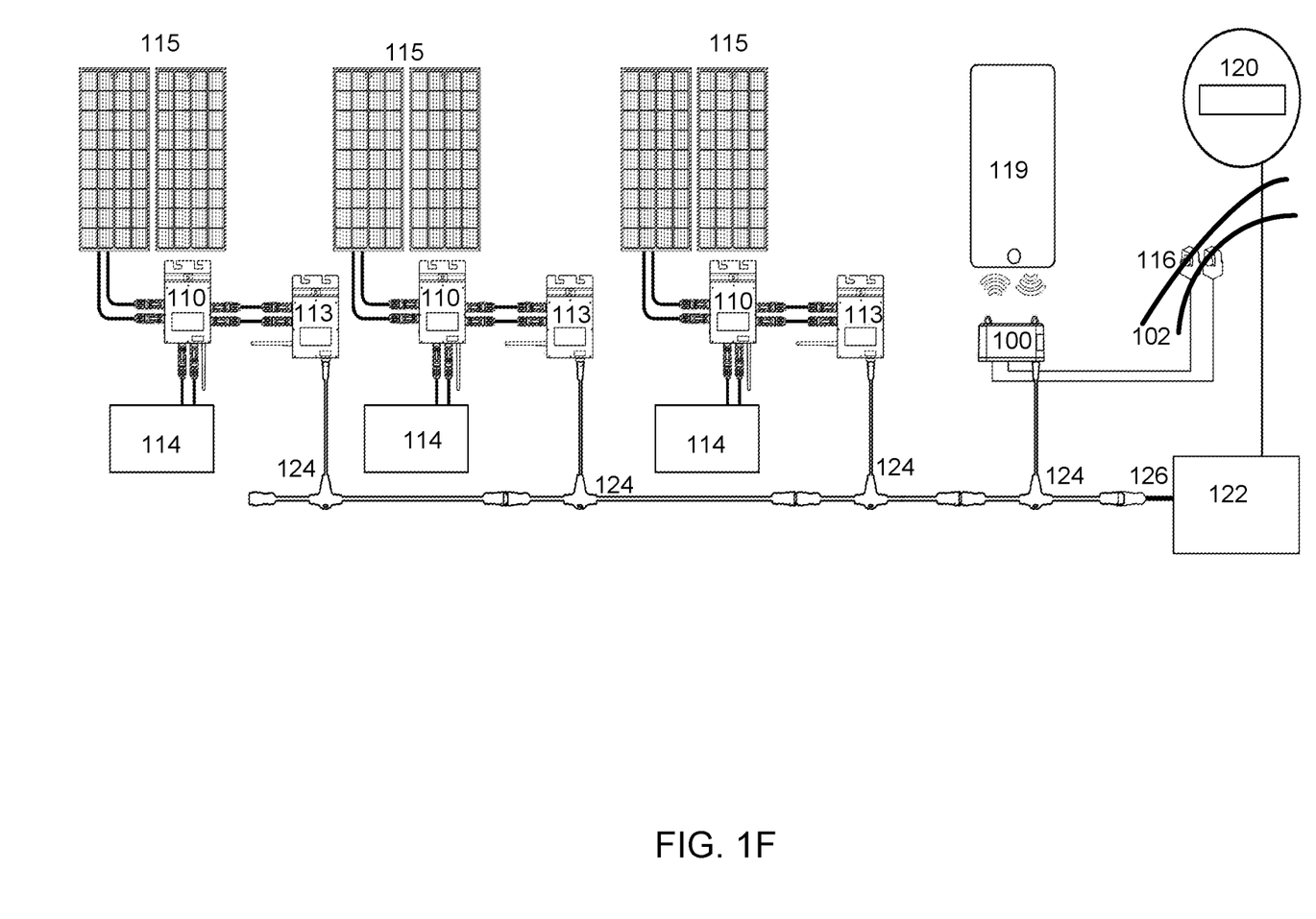
FIG. 1F illustrates a view of an entire grid-isolated solar system, in accordance with one embodiment of the invention.

FIG. 1F illustrates a grid-isolated solar system, in accordance with one embodiment of the invention. The AC power insertion link 122 (e.g., a junction box, a single phase AC, a dual phase AC or a triple phase AC electrical outlet, or an equivalent) in various embodiments could couple solar generated AC electrical power into a single family house, apartment building, office building, or any type of structure that has a roof or some nearby space (not shown) that can support one or more solar cell panels 115. Each solar cell panel 115 is electrically coupled to a battery commander 110 that is in turn coupled to a battery module 114. The battery commander 110 is also coupled to a micro-inverter 113 that is coupled into a T-harness cable 124 that is coupled to a chain of T-harness cables 124 that are coupled to a solar electrical power regulator 100 coupled by wires to split core transformers 116 that monitor the two hot phase wires of the building's external electrical utility AC power cables 102. The solar electrical power regulator 100 is also coupled by a T-harness cable 124 to a straight connector 126 to couple to the AC power insertion link 122 (which is used by the invention, but which is not part of the invention).

In one embodiment, the solar electrical power regulator 100 includes a Bluetooth wireless interface (e.g., Bluetooth 4.1, or an equivalent wireless interface) that allows the consumer to monitor the electrical power production and consumption, check the system operational health, and perform other functions through a smart device (e.g., an Apple or Android device, or an equivalent device). In one embodiment, the solar electrical power regulator 100 can communicate with up to 32 micro-inverters. In another embodiment, the solar electrical power regulator 100 can communicate with more than 32 micro-inverters.

Various embodiments of the micro-inverters are designed to achieve a substantially ideal system match for high efficiency DC to AC conversion. In one embodiment of the invention, up to 32 micro-inverters can be connected in a daisy-chain. In one embodiment, the micro-inverters employ maximum power point tracking (MPPT) technology to achieve maximum power output in full sun and partial shade conditions. In one embodiment, easy wiring simplifies connectivity. In various embodiments, the micro-inverters outperform prior art central inverters due to their lack of a single point of failure. In various embodiments, each micro-inverter and solar cell panel works independently of each other to maximize energy production in partial cloud or shady conditions.

The DC/DC Boost can be commercially obtained from Analog Devices Inc., with corporate headquarters in Norwood, Mass.; or commercially obtained from Texas Instruments, with corporate headquarters in Dallas, Tex. DC/AC converters can be commercially obtained from Panasonic, with corporate headquarters in Osaka, Japan; Yageo Corporation, with corporate headquarters in New Taipei City, Taiwan; AVX Corporation, with corporate headquarters in Birmingham, Ala.; or Samsung, with corporate headquarters in Suwon, South Korea.

The microprocessors or micro-controllers used in the solar electrical power regulator 100, the battery commander 110, and the micro-inverter 113 can be different or be the same. Each microprocessor or micro-controller can have a 8 bit, 16 bit, or 32 bit bus architecture, and can be commercially obtained from Atmel, with corporate headquarters in San Jose, Calif.; or commercially obtained from Microchip Technology, with corporate headquarters in Chandler, Ariz.

LED indicators or LED indicator lights can be commercially obtained from Lite-On, with corporate headquarters in Taipei City, Taiwan; or Lumex Inc., with corporate headquarters in Carol Stream, Illinois; or Panasonic, with corporate headquarters in Osaka, Japan. The wireless modules can be commercially obtained from Microchip Technology, with corporate headquarters in Chandler, Ariz.; or Silicon Labs, with corporate headquarters in Austin, Tex.

In one embodiment of the invention, the AC detection circuit uses a standard operational amplifier, which is commercially available from either Texas Instruments, with corporate headquarters in Dallas, Tex.; or Diodes Incorporated, with corporate headquarters in Plano, Tex. In one embodiment of the invention, the current detection circuit uses a standard operational amplifier, which is commercially available from either Texas Instruments, with corporate headquarters in Dallas, Tex.; or Diodes Incorporated, with corporate headquarters in Plano, Tex. Split core transformers are commercially available from CR Magnetics, with corporate headquarters in St. Louis, Mo.; or KEMET, with corporate headquarters in Simposonville, S.C.

In one embodiment of the invention, the DC switch can be a mechanical relay, which is commercially available from either Panasonic, with corporate headquarters in Osaka, Japan; or TE Connectivity, with corporate headquarters in Schaffhausen, Switzerland. In one embodiment of the invention, the DC switch can be a Bipolar Junction Transistor, or Field Effect Transistor, which is commercially available from either Texas Instruments, with corporate headquarters in Dallas, Tex.; or ON Semiconductor, with corporate headquarters in Phoenix, Ariz.

In one embodiment of the invention, the PWM charge circuit can be a Bipolar Junction Transistor, or Field Effect Transistor, which is commercially available from either Texas Instruments, with corporate headquarters in Dallas, Tex.; or ON Semiconductor, with corporate headquarters in Phoenix, Ariz.

Figure 2:
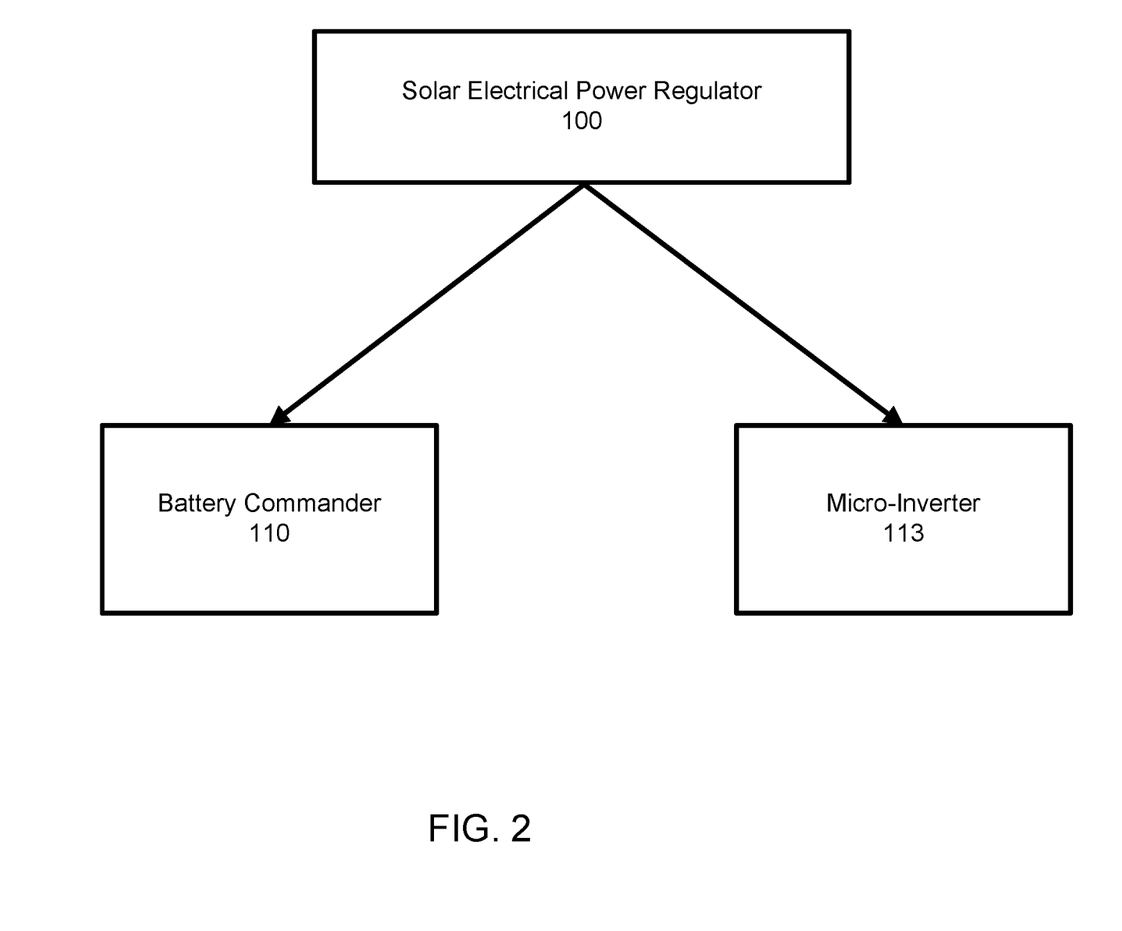
FIG. 2 illustrates a grid-isolated solar system, in accordance with one embodiment of the invention.

FIG. 2 illustrates a grid-isolated solar system, in accordance with one embodiment of the invention. This embodiment includes a solar electrical power regulator 100 coupled to a battery commander 110, and coupled to a micro-inverter 113.

Figure 3:
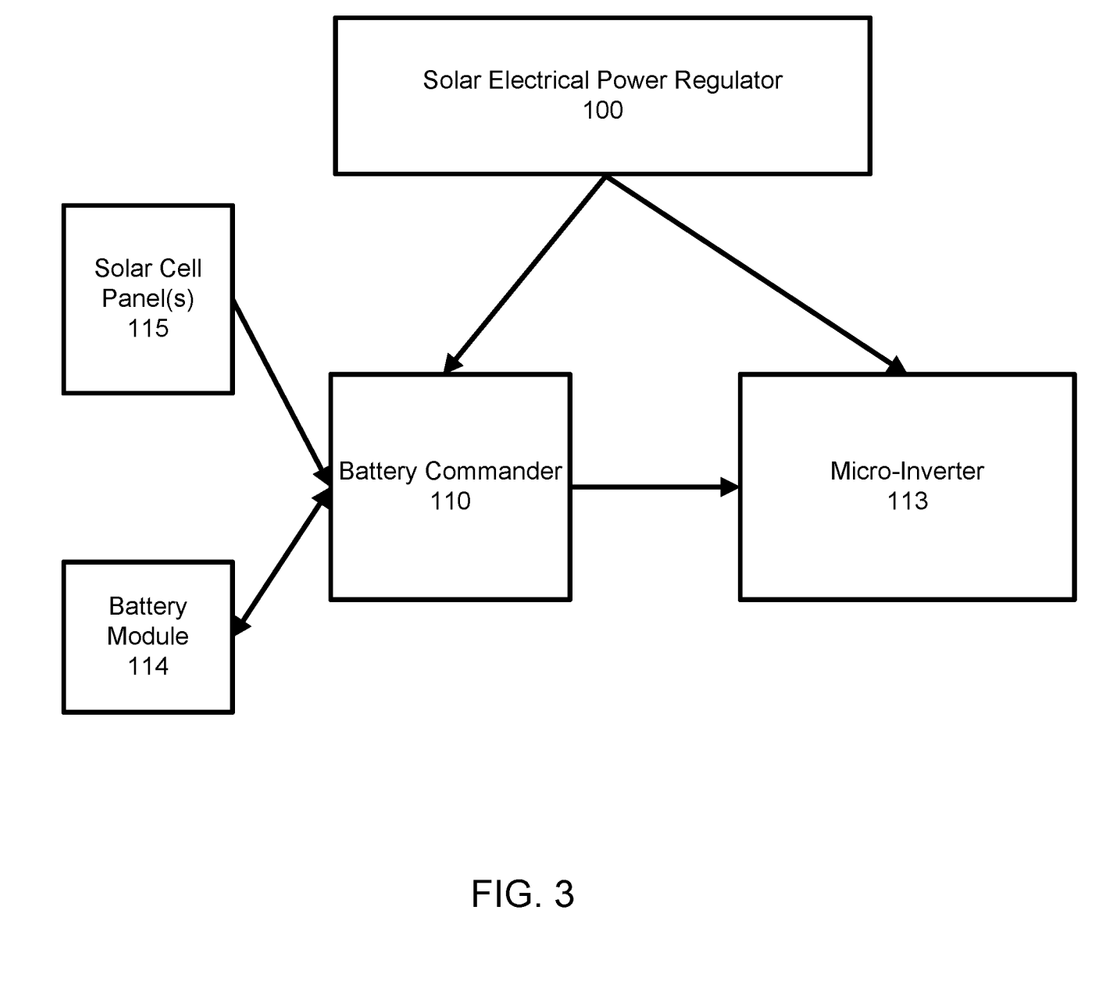
FIG. 3 illustrates a grid-isolated solar system, in accordance with one embodiment of the invention

FIG. 3 illustrates a grid-isolated solar system, in accordance with one embodiment of the invention. This embodiment includes a solar electrical power regulator 100 coupled to a battery commander 110, and coupled to a micro-inverter 113. The battery commander 110 is coupled to solar cell panel(s) 115 and a battery module 114.

Figure 4A:
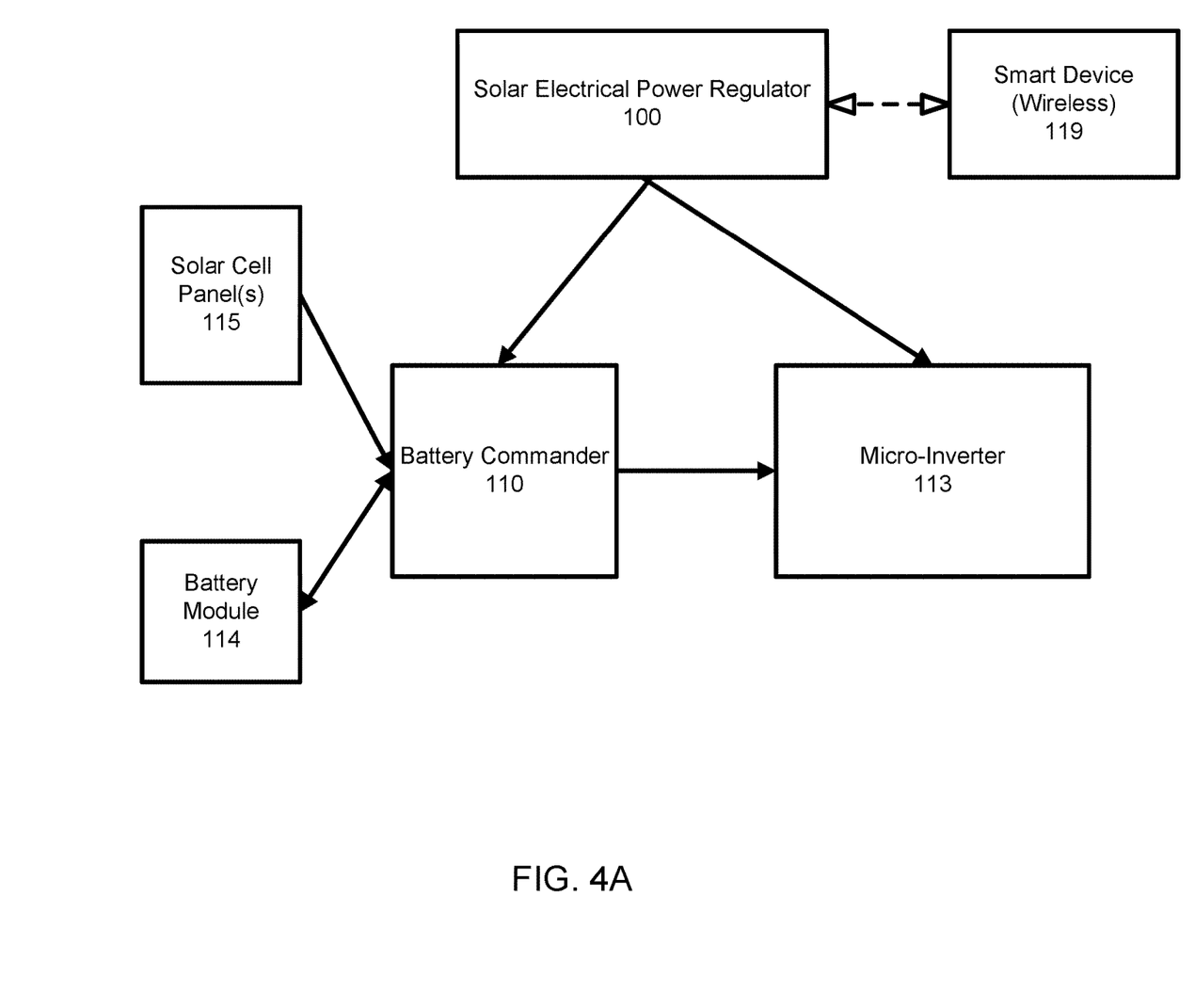
FIG. 4A illustrates a grid-isolated solar system, in accordance with one embodiment of the invention.

FIG. 4A illustrates a view of a battery commander and an off-grid controller, in accordance with one embodiment of the invention. This embodiment includes a solar electrical power regulator 100 coupled to a battery commander 110, and coupled to a micro-inverter 113. The solar electrical power regulator 100 is wirelessly coupled to a smart device 119 (e.g., a smart phone, a tablet computer, or an equivalent smart device) that communicates information from the solar electrical power regulator 100. The battery commander 110 is coupled to solar cell panel(s) 115 and a battery module 114.

Figure 4B:
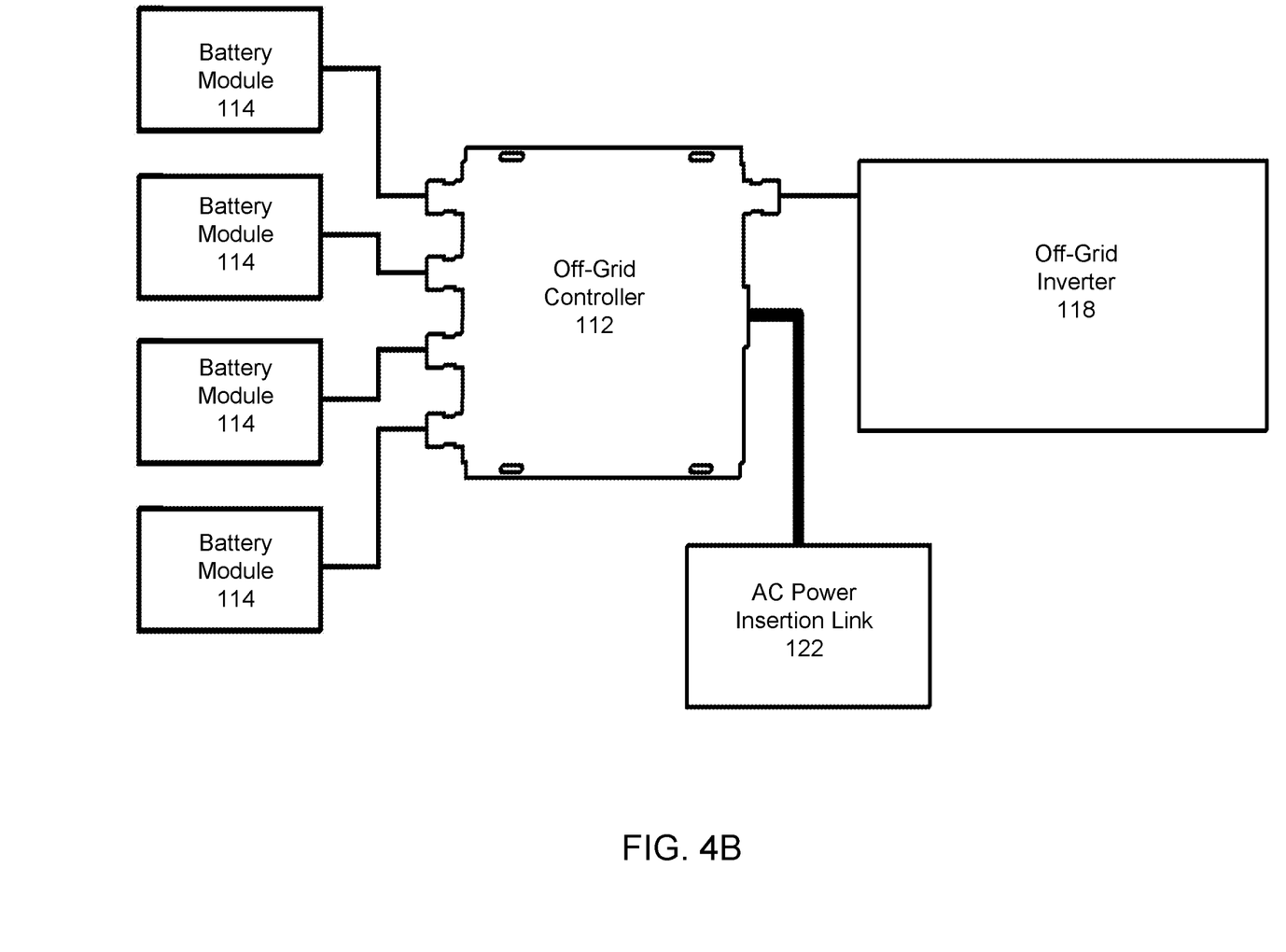
FIG. 4B illustrates an off-grid controller and off-grid inverter of a grid-isolated solar system, in accordance with one embodiment of the invention.

FIG. 4B illustrates an off-grid controller and off-grid inverter a grid-isolated solar system, in accordance with one embodiment of the invention. The AC power insertion link 122 (e.g., a junction box, a single phase AC, a dual phase AC or a triple phase AC electrical outlet, or an equivalent) in various embodiments could couple solar generated AC electrical power into a single family house, apartment building, office building, or any type of structure. The off-grid controller 112 is coupled with the battery modules 114 and the off-grid inverter 118. In one embodiment, the off-grid controller is simply a battery capacity multiplexer. It multiplexes the battery modules so that when one battery module runs out of power, it switches that battery module off and another battery module is turned-on to create a seamless user experience so that the customer does not have switch battery modules. This action is microprocessor or micro-controller controlled using an algorithm explained below. The off-grid controller 112 is also coupled to the AC power insertion link 122 (which is not part of the invention).

Figure 4C:
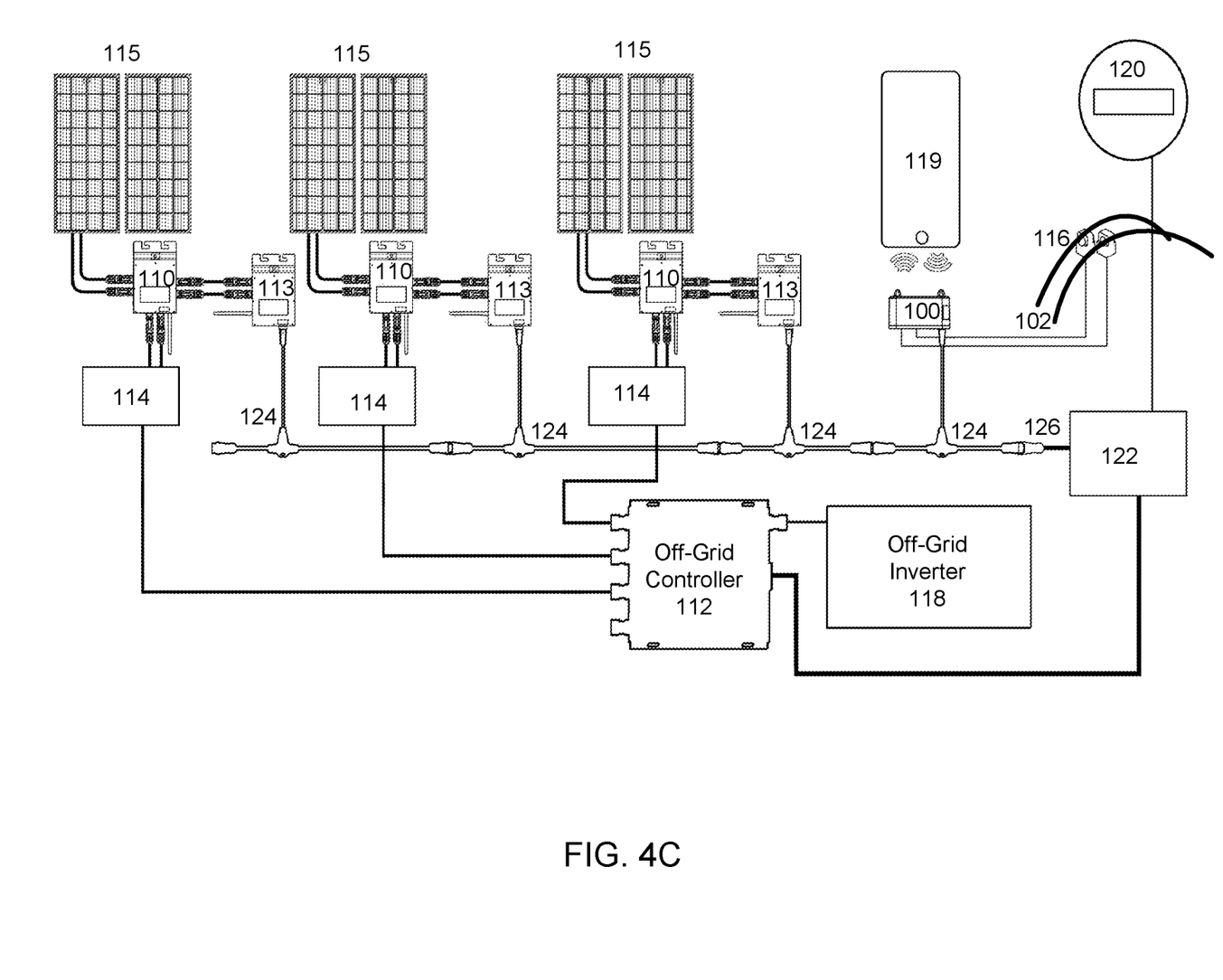
FIG. 4C illustrates a grid-isolated solar system, in accordance with one embodiment of the invention.

FIG. 4C illustrates a grid-isolated solar system, in accordance with one embodiment of the invention. The AC power insertion link 122 (e.g., a junction box, a single phase AC, a dual phase AC or a triple phase AC electrical outlet, or an equivalent) in various embodiments could couple solar generated AC electrical power into a single family house, apartment building, office building, or any type of structure that has a roof or some nearby space (not shown) that can support one or more solar cell panels 115. Each solar cell panel 115 is electrically coupled to a battery commander 110 that is in turn coupled to a battery module 114. The battery commander 110 is also coupled to a micro-inverter 113 that is coupled into a T-harness cable 124 that is coupled to a chain of T-harness cables 124 that are coupled to a solar electrical power regulator 100 coupled by wires to split core transformers 116 that monitor the two hot phase wires of the building's external electrical utility AC power cables 102. The off-grid controller 112 is coupled with the battery modules 114 and the off-grid inverter 118. The solar electrical power regulator 100 is also coupled by a T-harness cable 124 to a straight connector 126 to couple to the AC power insertion link 122 (which is used by the invention, but which is not part of the invention).

Figure 5:
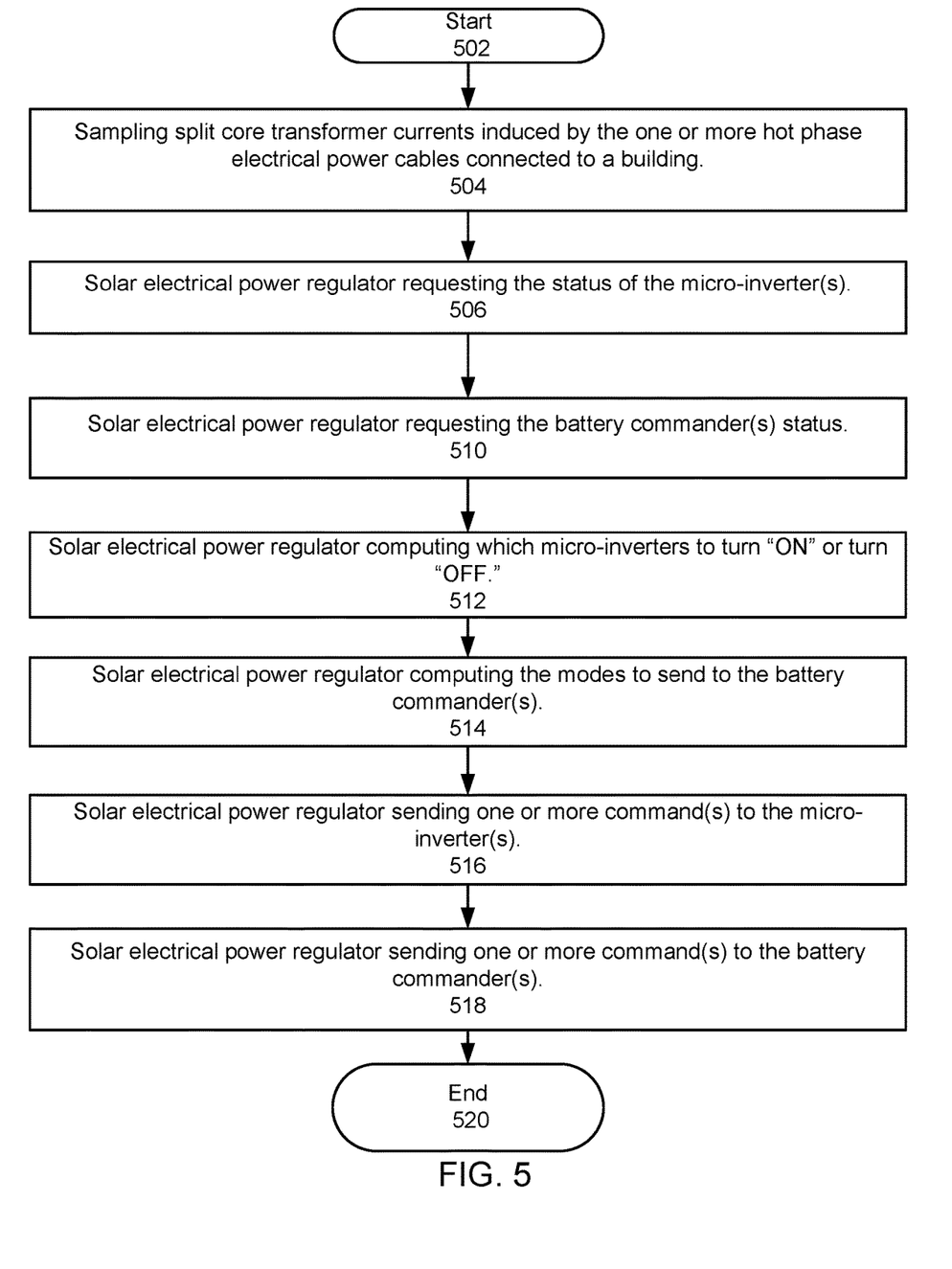
FIG. 5 illustrates a flowchart of how a solar power energy regulator can operate a grid-isolated solar system, in accordance with one embodiment of the invention.

FIG. 5 illustrates a flowchart to operate a grid-isolated solar system, in accordance with one embodiment of the invention. The method starts in operation 502. Operation 504 is next and includes sampling split core transformer currents induced by the one or more hot phase electrical power cables connected to a building. Operation 506 is next and includes the solar electrical power regulator requesting the status of the micro-inverter(s). Operation 510 is next and includes the solar electrical power regulator requesting the battery commander(s) status. Operation 512 is next and includes the solar electrical power regulator computing which micro-inverter(s) to turn "ON" or turn "OFF." Operation 514 is next and includes the solar electrical power regulator computing the modes to send to the battery commander(s). Operation 516 is next and includes the solar electrical power regulator sending one or more command(s) to the micro-inverter(s). Operation 518 is next and includes the solar electrical power regulator sending one or more command(s) to the battery commander(s). The method ends in operation 520.

Other embodiments of the invention are possible. For example, the grid-isolated solar system could be composed of various wireless modules for different applications. Another embodiment of the invention could provide multiple battery modules to accommodate different sizes and power generating capacities of solar panels.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A grid-isolated solar system, comprising:
   a solar electrical power regulator that includes a microprocessor or micro-controller;
   one or more battery commanders to route DC electrical power to or from one or more external battery modules, wherein each battery commander is controlled by the solar electrical power regulator; and
   one or more micro-inverters that can take DC electrical power as an input from the one or more battery commanders and produce AC electrical power, wherein each of the one or more micro-inverters is controlled by the solar electrical power regulator, wherein the solar electrical power regulator includes a wireless module configured to control the solar electrical power regulator to limit production of the AC electrical power by the one or more micro-inverters to be no greater than a locally needed amount and selectively avoid the AC electrical power from reaching through an electrical utility meter to an electrical utility grid.

2. The system of claim 1, further comprising:
   one or more T-harness connectors that are coupled to the one or more of micro-inverters; and
   one or more straight connectors to connect to one or more T-harness connectors.

3. The system of claim 1, further comprising:
   a wireless device coupled wirelessly with the solar electrical power regulator to supply a consumer with information regarding the system health, energy production, consumption, and configurations.

4. The system of claim 1, further comprising:
   one or more split core transformers that can provide two or more current measurements from a plurality of electrical utility lines coupled to a building junction box.

5. The system of claim 4, further comprising:
   an off-grid inverter; and
   an off-grid controller, wherein the off-grid controller is coupled to one or more battery modules, and the off-grid controller selectively provides DC electrical power from the one or more external battery modules to the off-grid inverter to produce AC electrical power, and the off-grid controller selectively provides the AC electrical power to an AC power insertion link.

6. A grid-isolated solar system apparatus, comprising:
   one or more split core transformers that can provide two or more current measurements from one or more electrical utility lines coupled to a building junction box;

one or more micro-inverters having inputs that can be connected to one or more external solar power panels, and outputs that can provide AC electrical power;
one or more battery commanders, wherein the one or more battery commanders can couple the one or more external solar panels to one or more external battery modules; and
a solar electrical power regulator that can couple to the one or more battery commanders, the one or more micro-inverters and the one or more split core transformers, wherein AC electrical power from the one or more micro-inverters is blocked from reaching through an electrical utility meter to an electrical utility grid.

7. The apparatus of claim 6, wherein the solar electrical power regulator includes one or more AC current detection circuits that can be coupled to the two or more split core transformers.

8. The apparatus of claim 6, further comprising:
one or more T-harness connectors that are coupled to the one or more of micro-inverter(s)s; and
one or more straight connectors to connect to one or more T-harness connectors.

9. The apparatus of claim 6, wherein the solar electrical power regulator includes a wireless module allowing the solar electrical power regulator to limit the production of AC electrical power by the one or more micro-inverters.

10. The apparatus of claim 6, further comprising:
one or more T-harness connectors that are coupled to the one or more of micro-inverters; and
one or more straight connectors to connect to one or more T-harness connectors.

11. The apparatus of claim 6, further comprising:
a smart device that can selectively couple wirelessly with the solar electrical power regulator.

12. The apparatus of claim 6, wherein the one or more battery commanders can selectively route DC electrical power from one or more external solar cell panels to one or more external battery modules or one or more micro-inverters.

13. The apparatus of claim 6, further comprising:
an off-grid inverter, having one or more electrical outlets to provide AC electrical power; and
an off-grid controller, wherein the off-grid controller is coupled to one or more battery modules, and the off-grid controller selectively provides DC electrical power from the one or more external battery modules to the off-grid inverter to produce AC electrical power, and the off-grid controller selectively provides the AC electrical power to an AC power insertion link.

14. A grid-isolated solar system apparatus, comprising:
one or more split core transformers that can provide one or more current measurements from one or more electrical utility lines coupled to a building junction box;
one or more micro-inverters having inputs that can be coupled to one or more external solar power panels, and outputs that can provide AC electrical power to a building;
one or more battery commanders, wherein the one or more battery commanders can couple the one or more external solar panels to one or more external battery modules; and
a solar electrical power regulator that can couple to the one or more battery commanders, the one or more micro-inverters and the one or more split core transformers, wherein AC electrical power produced from the one or more micro-inverters can be selectively blocked from reaching through an electrical utility meter to an electrical utility grid, wherein a wireless module is included with the solar electrical power regulator to allow a wireless smart device to communicate with the solar electrical power regulator.

15. The apparatus of claim 13, wherein the one or more battery commanders can selectively route DC electrical power from one or more external solar cell panels to one or more external battery modules or one or more micro-inverters.

16. The apparatus of claim 13, wherein the solar electrical power regulator includes one or more AC current detection circuits that can be coupled to the two or more split core transformers.

17. The apparatus of claim 13, further comprising:
one or more T-harness connectors that are coupled to the one or more of micro-inverter(s)s; and
one or more straight connectors to connect to one or more T-harness connectors.

18. The apparatus of claim 13, wherein the solar electrical power regulator includes a microprocessor or a micro-controller and a primary wireless module, and each battery commander includes a microprocessor or a micro-controller and a secondary wireless module, and each micro-inverter includes a microprocessor or a micro-controller and a secondary wireless module.

19. The apparatus of claim 18, wherein the solar electrical power regulator microprocessor or micro-controller is the same microprocessor or micro-controller included in each battery commander and included in each micro-inverter.

\* \* \* \* \*